United States Patent [19]

Locher et al.

[11] Patent Number: 4,520,419

[45] Date of Patent: May 28, 1985

[54] POLARITY AND OVERLOAD PROTECTIVE CIRCUIT FOR ELECTRIC CONSUMERS

[75] Inventors: Johannes Locher, Stuttgart; Wolfgang Schmidt, Vaihingen/Enz, both of Fed. Rep. of Germany

[73] Assignee: Robert Bosch GmbH, Stuttgart, Fed. Rep. of Germany

[21] Appl. No.: 522,844

[22] Filed: Aug. 12, 1983

[30] Foreign Application Priority Data

Aug. 21, 1982 [DE] Fed. Rep. of Germany ....... 3231143

[51] Int. Cl.³ .......................... H02H 3/18; H02H 3/20
[52] U.S. Cl. ........................................ 361/104; 361/77; 361/55; 361/56; 361/105; 320/25; 320/33; 320/34; 320/53; 307/10 BP; 307/127; 340/636
[58] Field of Search ................... 361/104, 105, 91, 56, 361/55, 77, 111, 119, 118, 84, 54; 320/25, 28, 33, 34, 53, 54; 307/127, 10 BP, 146; 340/636, 638, 639, 645

[56] References Cited

U.S. PATENT DOCUMENTS

| | | | |
|---|---|---|---|
| 3,312,889 | 4/1967 | Gold | 320/54 |
| 3,484,653 | 12/1969 | Takaoka | 361/104 |
| 3,809,993 | 5/1974 | Wheeler | 320/25 |
| 4,296,398 | 10/1981 | McGalliard | 361/104 X |
| 4,393,432 | 7/1983 | Neuhaus et al. | 361/104 |

FOREIGN PATENT DOCUMENTS

| | | | |
|---|---|---|---|
| 298375 | 1/1930 | Fed. Rep. of Germany | 361/104 |
| 2743622 | 5/1979 | Fed. Rep. of Germany | 307/146 |
| 1310354 | 3/1973 | United Kingdom | 361/56 |

OTHER PUBLICATIONS

IBM Technical Disclosure Bulletin, vol. 4, No. 9, Feb. 1962, "Protective Circuit".
IBM Tech. Discl. Bull., vol. 19, No. 4, Sep. 1976, "Monolithic Integrated Circuit Fuse Link".

Primary Examiner—Patrick R. Salce
Attorney, Agent, or Firm—Michael J. Striker

[57] ABSTRACT

The protective circuit against overpoling and overloading of an electronic consumer includes a combination of a zener diode connected parallel to the consumer and a parallel connection of a fuse and a conventional diode connected in series with one power supply terminal. Preferably an additional fuse is connected in series between the power supply and the first-mentioned fuse. In the case of a polarity reversal, a fuse burns out, but after restoring normal operational conditions the protective circuit permits operation of the consumer.

8 Claims, 1 Drawing Figure

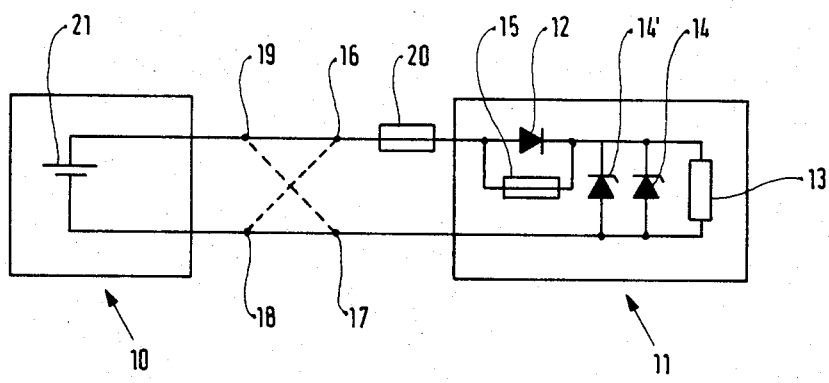

POLARITY AND OVERLOAD PROTECTIVE CIRCUIT FOR ELECTRIC CONSUMERS

BACKGROUND OF THE INVENTION

The invention relates to a protective circuit against overpoling and overloading of electronic consumers connectable via terminal conduits to a power source.

A prior art protective circuit of this kind is described in IBM Technical Disclosure Bulletin Vol. 4, No. 9, February 1962, p. 66. in this circuit, the two power feeding terminals connectable to a power supply are provided with a series-connected fuse and with a zener diode bridging an electronic consumer. Under normal operating conditions, that is when a voltage of a predetermined amplitude and of correct polarity is applied to the terminals of the consumer, the zener diode is in its blocking condition. If the polarity of the power supply is accidentally reversed, or if the applied voltage exceeds or equals the breakdown voltage of the zener diode, then the latter becomes conductive and passes a high current which in turn burns the fuse, thus protecting the electronic device against damage. The disadvantage of this known protective circuit is the fact that, after the removal of the cause of the burning of the fuse, the operability of the entire arrangement is dependent on the availability of a corresponding replacement fuse. Especially in the case when the protective circuit of this kind is employed in a motor vehicle, it frequently happens that a suitable replacement fuse is not at hand.

In another prior art protective circuit for electrical consumers, disclosed for example in the German Pat. No. 2,748,267, a diode is connected in series with the consumer. The diode is oriented in such a manner that, in the case of incorrect polarity applied to the circuit terminals, it is polarized in reverse direction and consequently prevents the energization of the consumer. The disadvantage of this known protective circuit is power loss produced by the diode under normal operational conditions of the device. Due to the power loss, the diode heats up and, in extreme situations such as at very high ambient temperatures, the diode is prone to failure and may cause or contribute to a premature disconnection of an electronic consumer, for example in a motor vehicle. A further disadvantage of this protective circuit results due to the voltage drop across the diode, which reduces the actual voltage applied to the consumer. This voltage drop depends also on the ambient temperature, and for example in the case of extremely low ambient temperature the voltage drop on the diode may cause a malfunction of electrically driven circuits used frequently in motor vehicles for performing controlling functions.

A further prior art protective device is known from the German publication DE-OS No. 2,211,337 which protects against overpoling of a power supply. In this known arrangement, a working contact of a relay is connected in series with a terminal conduit between a power source and the electronic consumer. The coil of the relay is connected in series with a diode, and the series connection bridges the two terminal conduits parallel to the power source. In the case of incorrect polarity of the power source, the diode is biased into its closing direction and prevents a current flow through the coil of the relay, so that its working contact is in open position. The disadvantage of this known arrangement is a relatively slow response of the relay, which in most cases does not provide sufficiently short disconnection of its working contact. Accordingly, it is desirable to provide faster protecting circuits of this kind.

SUMMARY OF THE INVENTION

A general object of the present invention is to overcome the aforementioned disadvantages of the prior art.

More particularly, it is an object of the invention to provide an improved protective circuit which, in the case of incorrect polarization (which situation occurs relatively rarely), blocks the current passage and after the removal of the error the electronic consumer becomes immediately operative without the necessity of replacement fuses.

Another objective of this invention is to provide a protective circuit at which full amount of power supply voltage is applied to the consumer and at which power losses due to the component parts of the circuit are kept at a minimum.

In keeping with these objects and others which will become apparent hereafter, one feature of the invention resides in the provision of a fuse connected in series with one terminal conduit of the consumer, a zener diode bridging the terminal conduits parallel to the consumer load, and a diode connected parallel to the fuse.

The protective circuit of this invention does not lose its overpoling protective quality even after the occurrence of an overload.

In a further elaboration of this invention, an additional fuse is connected in series with the terminal conduit and power loss dissipation can be advantageously distributed by using several parallel-connected zener diodes.

The novel features which are considered characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

The single FIGURE shows a circuit diagram of an embodiment of the protective circuit of this invention.

DESCRIPTION OF THE PREFERRED EMBODIMENT

In the FIGURE, reference numeral 10 denotes a power supply including a battery 21 and two terminal contacts 18 and 19. The electronic consumer circuit 11 includes a loading part or current consumer indicated by reference numeral 13 and connected to the power supply 10 via terminal conduits 16 and 17. Conduit 16 includes series-connected fuses 20 and 15. Fuse 15, which may be a melting type fuse or a bimetal overvoltage protecting device as for example shown in the German Offenlegungsschrift DE-OS No. 2,719,329, is connected in parallel with a diode 12. Both conduits 16 and 17 are interconnected by two zener diodes 14 and 14' bridging the load 13. The outer fuse 20 serves as a safety fuse for the case when a short circuit develops in the consumer 11 and fuse 15 fails. In this example, the correct polarity of the connections between terminal contacts 16 and 19 and 17 and 18 is indicated by full lines. During this prescribed polarity of the contact terminals, full power supply voltage is applied across the zener diodes 14 and 14' because no voltage drop develops across the series-connected diode 12 which is bridged by the low ohmic fuse 15. Accordingly, the load or consumer 13 is supplied with full supply voltage. Overvoltages which may result for example from connection or disconnection of other electrical consumers and are superposed onto the supply voltage are limited by the parallel-connected zener diodes 14 and 14' whose zener voltage corresponds to the desired voltage across the consumer 13. In the case of an incorrect polarity reversal of the power supply 10 when terminal 19 is connected to terminal 17 and terminal 18 to terminal 16, as indicated by dashed lines, the zener diodes 14 and 14' become conductive, whereby at a small voltage drop a high current flows through fuses 20, 15 and zener diodes 14 and 14'.

The two fuses are dimensioned such that the fuse 15 is either weaker or stronger than the outer fuse 20. In the case of an overload, the weaker fuse 15 melts, and the diode 12, which is now biased in its blocking condition, protects the consumer 13 against destruction. After the correction of the faulty polarity, the consumer 11 is immediately operable, because the stronger outer fuse 20 is still conductive. The only difference is that, with interrupted fuse 15, a voltage drop develops across the diode 12 with the usual heat generation in the diode, and the consumer receives reduced voltage. If, however, the outer fuse 20 is dimensioned weaker than the fuse 15, then it interrupts the power supply after the occurrence of an overvoltage, and normal operation of the consumer can be resumed only after replacement of the outer fuse 20. In this case, true power supply voltage is again fed to the consumer 13.

It will be understood that each of the elements described above, or two or more together, may also find a useful application in other types of constructions differing from the types described above.

While the invention has been illustrated and described as embodied in a specific example of a protective circuit, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

We claim:

1. A polarity and overload protecting circuit for use in connection with an electric current consumer operating at a prescribed operational voltage and having at least two power supply conduits, the circuit comprising a fuse connected in series with one power supply conduit, a zener diode bridging the two power supply conduits and having its breakdown voltage adjusted to the prescribed operational voltage of the consumer, and a diode connected parallel to said fuse.

2. A protecting circuit as defined in claim 1, wherein a further fuse is connected in series between a power supply and the first-mentioned fuse.

3. A protecting circuit as defined in claim 2, wherein the two fuses have different ratings.

4. A protecting circuit as defined in claim 1, wherein an additional zener diode is connected parallel to the first mentioned zener diode.

5. A protecting circuit as defined in claim 1, wherein said electric current consumer includes a printed circuit board with printed terminal conduits and said fuse is a narrow section of one of said conduits.

6. A protecting circuit as defined in claim 5, wherein said fuse is a portion of a printed circuit having a reduced cross section.

7. A polarity and overload protecting circuit for use in connection with an electric current consumer operating at a prescribed operational voltage and having at least two power supply conduits, the circuit comprising an overload voltage sensitive switching element connected in series with one power supply conduit, a zener diode bridging the two power supply conduits and having its breakdown voltage adjusted to the prescribed operational voltage of the consumer, and a diode connected parallel to said switching element.

8. A protecting circuit as defined in claim 7 wherein said switching element is a bimetal switch.

* * * * *